United States Patent [19]

Kulwicki et al.

[11] 4,164,147
[45] Aug. 14, 1979

[54] TEMPERATURE SENSING APPARATUS

[75] Inventors: Bernard M. Kulwicki, Foxboro, Mass.; George Trenkler, East Providence, R.I.; David C. Hill, Attleboro, Mass.

[73] Assignee: Texas Instruments Incorporated, Dallas, Tex.

[21] Appl. No.: 866,107

[22] Filed: Dec. 30, 1977

[51] Int. Cl.² ............................................. G01K 7/34
[52] U.S. Cl. ................................... 73/362 R; 361/282; 361/321
[58] Field of Search .............. 73/362 R; 361/282, 321

[56] References Cited

U.S. PATENT DOCUMENTS

| | | | |
|---|---|---|---|
| 2,648,823 | 8/1953 | Kock et al. | 361/282 X |
| 3,260,116 | 7/1966 | Grady, Jr. | 73/362 R |
| 3,338,100 | 8/1967 | Takami | 73/362 R X |
| 3,505,872 | 4/1970 | Marlof | 73/362 R |
| 3,596,262 | 7/1971 | Rollwitz et al. | 73/362 R X |
| 3,728,641 | 4/1973 | Fujita et al. | 361/282 X |
| 3,772,748 | 11/1973 | Rutt | 361/321 X |
| 3,792,377 | 2/1974 | Fujita et al. | 361/282 X |

*Primary Examiner*—Charles Gorenstein
*Attorney, Agent, or Firm*—John A. Haug; James P. McAndrews

[57] ABSTRACT

A temperature sensor particularly adapted for use with digital displays or controls comprises an oscillator circuit coupled to a capacitor formed of ferroelectric material in order to provide a linear relation of frequency with temperature. Both chip and multilayer capacitors are shown to be useful as the sensing element.

11 Claims, 4 Drawing Figures

TEMPERATURE SENSING APPARATUS

This invention relates generally to temperature sensors and more particularly to temperature sensors suitable for use with digital circuit applications.

Conventional temperature sensors, such as temperature dependent resistors, or thermistors, have been used effectively with analog systems for many years, however they are not suitable for use in digital applications without some type of compensating circuitry for non linearity. That is, such resistors have as a characteristic an exponential temperature resistance curve except for some shallow sloped thermistors where over a narrow range the relationship is somewhat linear but still requires correction. In digital systems it is known to provide a temperature sensing system by making use of a frequency output, dependent upon temperature, by counting the pulses. Thus a conventional temperature sensing system useful with digital circuitry includes an oscillator circuit, a thermistor, circuitry for compensating for the non linearity of the temperature-resistance relationship and a pulse counter. Since digital temperature measurement is frequently used in applications where counters are already provided for other aspects of the application, for example in microwave oven controls where counters are employed in the control circuitry, a temperature dependent frequency control having a linear relationship would be very desirable since it could be used without any compensation for non linearity.

It is therefore an object of the invention to provide a temperature sensor which is particularly useful in a digital system. Another object is the provision of a temperature sensor which can be used with an oscillator circuit without any additional circuitry to compensate for non linearity of frequency with temperature. Yet another object is the provision of a sensor which is both inexpensive yet reliable and one that can be used over a wide temperature range.

Briefly, according to the invention an oscillator circuit whose frequency is dependent upon the reciprocal capacitance is employed in which the capacitor is made of ferroelectric material. The reciprocal of capacitance of such materials is linear with temperature so that the output of the oscillator is also linear over a wide range of temperatures. In applications where size of the sensor is not critical a disc or chip sensor can be utilized while in applications in which size must be minimized or where it is desired to control the slope of the reciprocal of capacitance versus temperature curve, a multilayer sensor can be used.

The present invention, as well as further objects and advantages thereof, may be more fully understood from the following description of preferred embodiments in conjunction with the drawings, in which.

Figure 1:
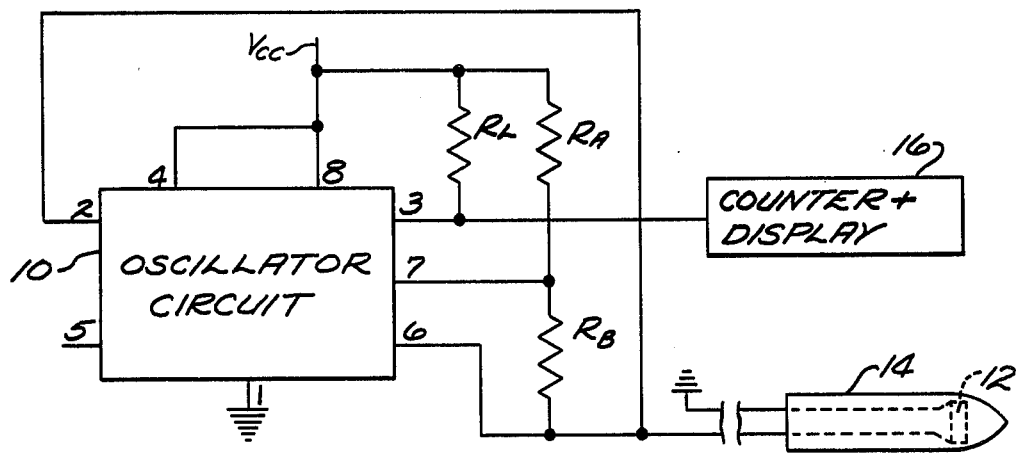
FIG. 1 is a schematic of a temperature sensor system made in accordance with the invention.

Turning now to the drawings numeral 10 designates an oscillator circuit such as the SN52555, SN72555 integrated monolithic timing circuit available from Texas Instruments Incorporated. A sensor 12, which may for instance be mounted in a suitable probe 14 is connected to the threshold of oscillator circuit 10 with a counter and display 16 coupled to the output of circuit 10.

Circuit 10 is used in its astable mode and as seen in FIG. 1 has its trigger terminal 2 coupled to threshold terminal 6. Sensor 12 is connected between threshold terminal 6 and ground. Reset terminal 4 is coupled to the $V_{cc}$ terminal 8 which in turn is connected to the output terminal 3 through resistor $R_L$ and to discharge terminal 7 through resistor $R_A$. Discharge terminal 7 is also connected to threshold terminal 6 through resistor $R_B$. The control voltage terminal 5 is open and terminal 1 is connected to ground.

The frequency for oscillator circuit 10 is given by the following formula:

$$f = 1.44/(R_A + 2R_B)C$$

Since the dielectric constant of ferroelectric materials, such as barium titanate, $BaTiO_3$, one of the more common ferroelectric materials, in accordance with the Curie-Weiss law is expressed by the following formula:

$$\epsilon \simeq C'/(T - T_C)$$

where $T_C$ = Curie temperature and since capacitance (in picofarads) is expressed as follows:

$$C = (\epsilon \times A/L)/11.3$$

where A = area in $cm^2$ and L = thickness in cm.

it will be seen that substituting for capacitance of ferroelectric materials in the frequency formula that frequency is a linear function of temperature.

$$f = 1.44 \, (T - T_c)/C''(R_A + 2R_B)$$

Therefore sensor 12, used as a capacitor formed of ferroelectric material will result in a frequency of the output of circuit 10 which is a linear function of temperature. The material used for sensor 12, such as $BaTiO_3$ and other perovskite class materials, is chosen having a high dielectric constant at its Curie temperature. The sensor is utilized in the para-electric state (above the Curie temperature) where the capacitance obeys the Curie-Weiss law.

Figure 2:
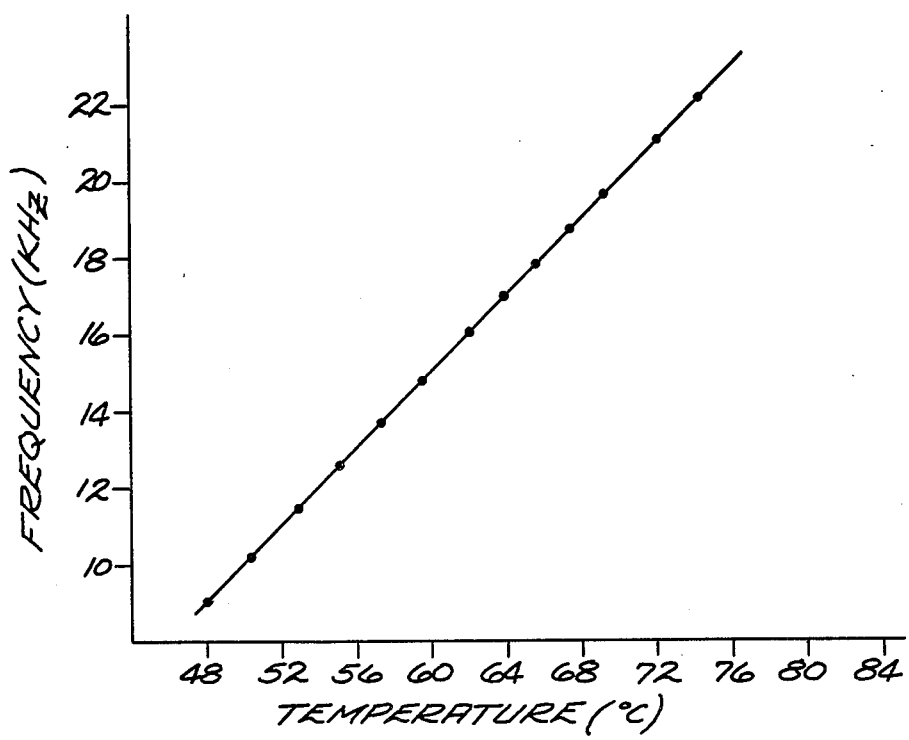
FIG. 2 is a graph of frequency versus temperature of the sensor system of FIG. 1.

FIG. 2 shows the results of a sensor 12 composed of a chip element of a barium titanate material used with timing circuit 10 as shown in FIG. 1. The specific material employed was $Ba_{.73}Sr_{.27}Ti_{1.00}Fe_{.001}Nb_{.01}O_3$ having a Curie temperature of 33° C. and a peak capacitance of 0.072 μF. The Curie temperature of 33° C. corresponds to the minimum frequency of 8 KHz. The resolution was approximately 2° C. per KHz. $R_A$ had a resistance of 470Ω, $R_B$ of 1 KΩ and $R_L$ 1 KΩ.

It will be seen that f (T) for the material used to obtain the FIG. 2 graph is linear from approximately 33° C. to 76° C. Beyond that range for that material the dielectric constant departs from the Curie-Weiss law.

Figure 4:
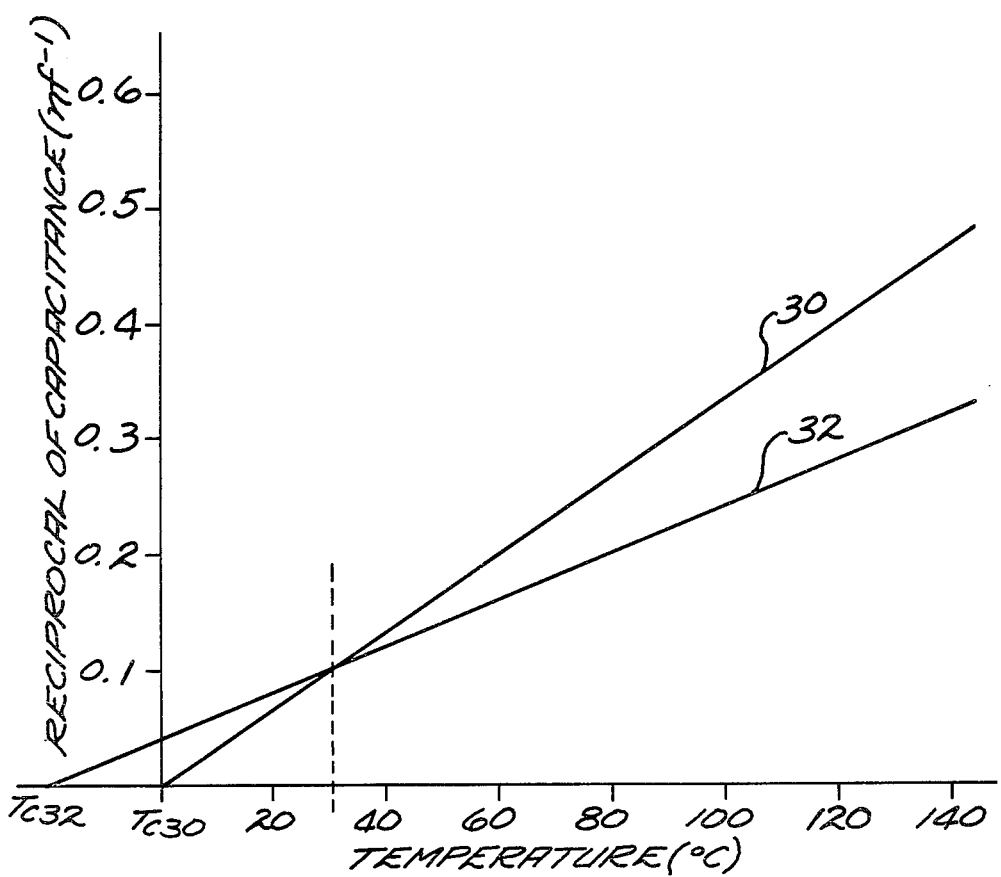
FIG. 4 is a graph of the reciprocal of capacitance versus temperature of typical ferroelectric capacitor sensors.

It will be understood that other known ferroelectric materials may be utilized having different Curie temperatures, slopes and effective temperature sensing ranges as will be explained in more detail below with reference to FIG. 4.

Figure 3:
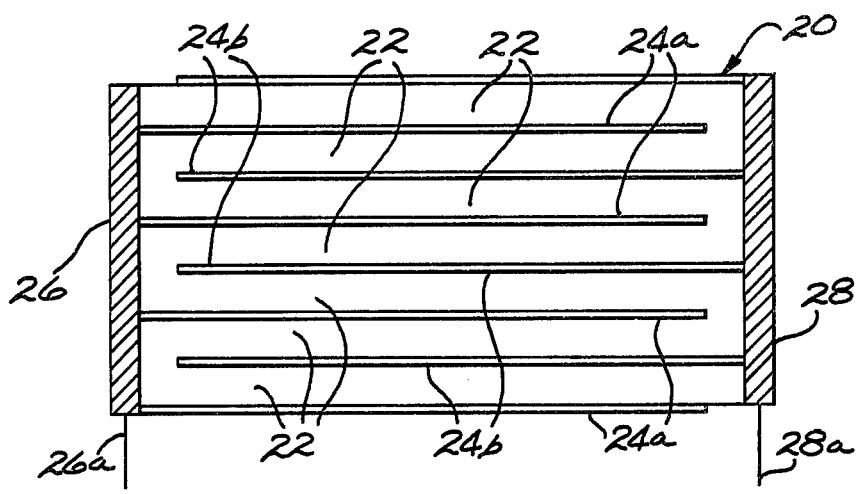
FIG. 3 is a multilayer sensor useful in the FIG. 1 system.

Although a wide range of capacitance can be used with the SN52555, SN72555 timing circuit it is preferred to employ a sensor having a relatively high capacitance in order to minimize distortion which could occur, particularly at high temperatures. That is, as the capacitance of sensor 12 decreases with an increase in temperature the inherent capacitance of the sensor leads, ordinarily negligible, can influence the frequency. This influence is minimized using high capacitance sensors. If the size of the sensor is not critical a chip sensor can be used having the desired capacitance level merely by increasing its size. However in certain applications it is desired to minimize the physical size of the sensor. For example in a microwave oven the temperature sensor probe is in the order of 150 mils in diameter. A sensor having a small configuration, yet having high capacitance, can be made as shown in FIG. 3. Sensor 20 comprises a plurality of layers 22 of ferroelectric ceramic material separated by interdigitated layers of metallization 24a and 24b. Layers 24a extend from a first terminal layer 26 on one side of sensor 20 close to a second terminal layer 28 on an opposite side of sensor 20 while layers 24b extend from layer 28 close to layer 26. Leads 26a and 28a are joined respectively to terminal layers 26, 28. A typical sensor 20 measures approximately 100 mils in length and width and each layer 22 has a thickness of approximately 2 mils. Capacitance can be increased merely by adding more layers 22.

Multilayer sensors 20 can be made for example by screen printing precious metal layers 24a and 24b onto layers of green barium titanate ceramic, laminating the layers together and firing the composite structure. Conventional silver paint can be painted onto the sides for layers 26, 28. Platinum, palladium and other precious metals are preferably used for layers 24a and 24b since they do not react with the barium titanate.

Multilayer sensors 20 also offer another benefit in that the slope of the reciprocal of capacitance versus temperature can be controlled for a given capacitance. This could be beneficial for instance if one wanted to obtain even greater resolution by increasing the slope or conversely, decreasing the slope to increase the temperature range for a given frequency range. The slope may be varied by using different Curie temperature materials in combination with varying the total thickness (number of ceramic layers 22) of the sensor. As seen in FIG. 4 a sensor with the reciprocal of capacitance versus temperature relationship 30 which is linear to approximately 160° C. has a Curie temperature $T_{C30}$. By selecting material having a lower Curie temperature, $T_{C32}$ and then increasing the capacitance at a given temperature (e.g. approximately 30° C. in FIG. 4) a lower slope is obtained having the same capacitance.

Sensors made in accordance with the invention can be used effectively with any type of oscillator circuit in which the frequency varies with the reciprocal of the first power of capacitance.

Having described the invention in combination with certain specific embodiments thereof it is to be understood that further modifications may now suggest themselves to those skilled in the art and it is intended to cover such modifications as fall within the scope of the appended claims.

We claim:

1. A temperature control system comprises oscillator circuit means having an output frequency dependent upon the first power of capacitance and a sensor having a linear output over a wide temperature range coupled to the circuit means, the sensor being formed of ferroelectric material selected such that the operating temperature of the environment in which the sensor is employed is above the Curie temperature of the ferroelectric material.

2. A temperature control system according to claim 1 further including frequency counter and display means coupled to the output of the oscillator circuit means.

3. A temperature control system according to claim 1 in which the sensor is a chip layer of barium titanate.

4. A temperature control system according to claim 3 in which the barium titanate has the composition $Ba_{.73}Sr_{.27}Ti_{1.00}Nb_{.01}Fe_{.001}O_3$.

5. A temperature control system according to claim 1 in which the sensor comprises a plurality of layers of barium titanate electrically coupled in parallel circuit relation.

6. A temperature control system according to claim 5 in which the barium titanate has the composition $Ba_{.73}Sr_{.27}Ti_{1.00}Nb_{.01}Fe_{.001}O_3$.

7. A temperature control system according to claim 1 in which the oscillator circuit means has an output frequency which is dependent upon the reciprocal of capacitance.

8. A temperature control system according to claim 1 in which the ferroelectric material has a high dielectric constant at its Curie temperature.

9. In a temperature control system comprising an oscillator circuit means having an output frequency dependent upon the first power of capacitance and a sensor coupled to the circuit means, the improvement comprising the sensor of ferroelectric material having a selected Curie temperature such that during normal operation the material is in the paraelectric state.

10. A temperature control system according to claim 9 in which the ferroelectric material is barium titanate.

11. A temperature control system according to claim 10 in which the barium titanate has the composition $Ba_{.73}Sr_{.27}Ti_{1.00}Nb_{.01}Fe_{.001}O_3$.

* * * * *